(12) United States Patent
Kuriyama

(10) Patent No.: US 7,138,000 B2
(45) Date of Patent: Nov. 21, 2006

(54) SOLID ELECTROLYTIC CAPACITOR AND METHOD OF MAKING THE SAME

(75) Inventor: Chojiro Kuriyama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 10/931,301

(22) Filed: Aug. 31, 2004

(65) Prior Publication Data

US 2005/0099759 A1   May 12, 2005

(30) Foreign Application Priority Data

Sep. 2, 2003   (JP) .............................. 2003-309649

(51) Int. Cl.
*H01G 9/00* (2006.01)

(52) U.S. Cl. ................. 29/25.03; 29/25.41; 29/25.42; 361/523; 361/525; 361/528; 361/529

(58) Field of Classification Search ........ 361/502–512, 361/516–519, 523–534; 29/25.03, 25.41–42
See application file for complete search history.

(56) References Cited

U.S. PATENT DOCUMENTS 5,667,536 A * 9/1997 Hasegawa .................. 29/25.03
5,949,639 A   9/1999 Maeda et al.
5,959,831 A   9/1999 Maeda et al.
6,139,593 A * 10/2000 Kono ........................ 29/25.03
6,319,292 B1 * 11/2001 Pozdeev-Freeman et al. ........................ 29/25.03
6,635,100 B1 * 10/2003 Sato ............................ 75/255
6,836,401 B1 * 12/2004 Yoshida et al. ............. 361/538

FOREIGN PATENT DOCUMENTS

JP    10-106897    4/1998
JP    10-106898    4/1998

* cited by examiner

*Primary Examiner*—Nguyen T. Ha
(74) *Attorney, Agent, or Firm*—Hamre, Schumann, Mueller & Larson, P.C.

(57) ABSTRACT

A method is provided for making a solid electrolytic capacitor comprising a flattened porous body. According to this method, use is made of a pair of pressure blocks and a vertical movement block for engagement with the pair of pressure blocks. The pair of pressure blocks face each other and are horizontally movable. A space is formed between these two pressure blocks for loading powder made of a valve metal. The powder loaded in the space is compressed by the pair of pressure blocks to form a flattened porous body. The compression by the pair of pressure blocks is brought about by a downward motion of the vertical movement block held in engagement with the pair of pressure blocks.

3 Claims, 13 Drawing Sheets

SOLID ELECTROLYTIC CAPACITOR AND METHOD OF MAKING THE SAME

BACKGROUND OF THE INVENTION

1. Field of the Invention

The present invention relates to a solid electrolytic capacitor employing a porous sintered body made of a valve-action metal, and to a method of making such a solid electrolytic capacitor.

2. Description of the Related Art

Electrolytic capacitors employing a porous body of a metal having a valve action (hereinafter simply 'valve metal') have been widely used in the past for purposes such as eliminating noise generated by a CPU or other device and stabilizing the power supply of electronic appliances.

An example of one method of making a conventional electrolytic capacitor of this type is provided in FIGS. 12 and 13 (cf. JP-A 10-106898). As shown in FIG. 12, the apparatus used in this method comprises a mold B1 containing a fixed block 101, a moveable block 102, and a pressure block 103. In this method, the space formed between fixed block 101 and moveable block 102 is filled with valve metal powder 104. Next, as shown in FIG. 13, a porous body 106 is formed by applying downward pressure to the powder 104 by lowering pressure block 103, into which a wire 105 has been set so as to protrude. This porous body is then fired and a porous sintered body obtained, from which the solid electrolytic capacitor is made.

In the method described above, the compression of the powder 104 takes place along the axis of the wire 105 during the pressurization process. As a result, there is a risk that the powder 104 will lack sufficient adhesiveness relative to the wire 105, and that the wire 105 and the porous body 106 will not bond satisfactorily.

Another method of making a solid electrolytic capacitor is shown in FIG. 14 (cf. JP-A 10-106897). The apparatus employed in this method comprises a mold B2 containing a fixed block 201, a moveable block 202, and a pair of pressure blocks 203. In this method, the space formed between fixed block 201 and the two pressure blocks 203 is filled with valve metal powder. This space is then covered with moveable block 202, into which a wire 205 has been set so as to protrude. After this, pressure is applied on the powder in a horizontal direction by means of the two pressure blocks 203, and a porous body is formed. With this method, the powder is compressed in a direction intersecting with the axis of wire 205. As a result, the powder is able to adhere satisfactorily to the wire 205.

Recent years have seen the development of CPUs with higher clock rates, and faster and digitized electronic appliances. In line with this, various new demands are being made for capacitors. For example, there is a need for improved noise elimination characteristics in broad frequency bands. There is also a growing demand for a highly responsive large-capacitance power supply supporting high frequencies. Making capacitors with larger capacitance, lower resistance, and lower impedance would be an effective way of responding to these demands. One desirable way of achieving this in the case of solid electrolytic capacitors comprising a porous sintered body would be to produce porous bodies that are larger, of a greater density, and also flatter than those in use heretofore.

The conventional method illustrated in FIG. 14, however, is unsuitable for making large, high-density, flattened porous bodies, for the reasons given below.

In order to make a larger, denser porous body by this method, it is necessary to increase the pressure applied on the valve metal powder, and also to increase the distance moved by the pressure blocks 203 as they compress the powder. For this purpose, a large-output drive source must be provided for each of the pressure blocks 203 (two drive sources in total). These two drive sources are installed opposite one another with the mold B2 between them while being spaced from one another in a horizontal direction. With this setup in place, however, the whole apparatus takes up too much space. Also, the need for two separate large-output drive sources is hardly desirable from the point of view of keeping costs low.

SUMMARY OF THE INVENTION

The present invention has been under such a situation. It is therefore an object of the present invention to provide a technique that will allow a large, high-density, flattened porous body to be made with the use of a compact apparatus and at low cost.

According to a first aspect of the present invention, a method is provided for manufacturing a solid electrolytic capacitor, comprising the steps of: filling a space with valve metal powder, the space being formed between a pair of horizontally movable pressure blocks facing each other; and compressing the powder by bringing the pair of pressure blocks toward each other for forming a flattened porous body. The compression of the powder is performed by lowering a vertical movement block toward and into engagement with the pair of pressure blocks the.

Preferably, the method for making a solid electrolytic capacitor further comprises the steps of introducing into the space from above at least one wire made of a valve metal before the compression of the powder, and severing the wire at a position spaced from the porous body after the compression of the powder.

Preferably, at least two wires are introduced into the space in the wire-introducing step, and the wires are severed at differing dimensions of protrusion from the porous body in the wire-severing step.

According to a second aspect of the present invention, an apparatus is provided for making a flattened porous body made of a metallic powder, comprising a pair of horizontally movable pressure blocks facing each other a fixed block supporting the pair of pressure blocks, and a vertical movement block positioned above the pair of pressure blocks, of the vertical movement block being engageable with the pressure blocks. The pair of pressure blocks are so designed as to move closer to each other in response to downward motion of the vertical movement block held in engagement with the pair of pressure blocks.

Preferably, each of the pressure blocks has a sloping face for engagement with the vertical movement block, whereas the vertical movement block has sloping faces for engagement with the sloping faces of the pressure blocks.

Preferably, the vertical movement block is provided with a vertically extending through-hole for allowing a wire to pass therethrough, and the wire being is introduced into the space formed between the pair of pressure blocks through the through-hole.

According to a third aspect of the present invention, an intermediate product is provided for making a solid electrolytic capacitor. The intermediate product comprises a porous body made of a valve metal, a first anode that protrudes from the porous body, and a second anode that protrudes from the porous body. The first and second anodes have lengths that differ from each other.

Other features and advantages of the present invention will become clear in the course of the description of the preferred embodiments that follows below.

DESCRIPTION OF THE PREFERRED EMBODIMENTS

A concrete description of preferred embodiments of the present invention follows below, referring to the attached drawings.

FIGS. 1 to 10 show a method of making a solid electrolytic capacitor according to the present invention. More precisely, these figures show a method for making a porous intermediate body (see FIG. 11) that is used to make a solid electrolytic capacitor.

Figure 1:
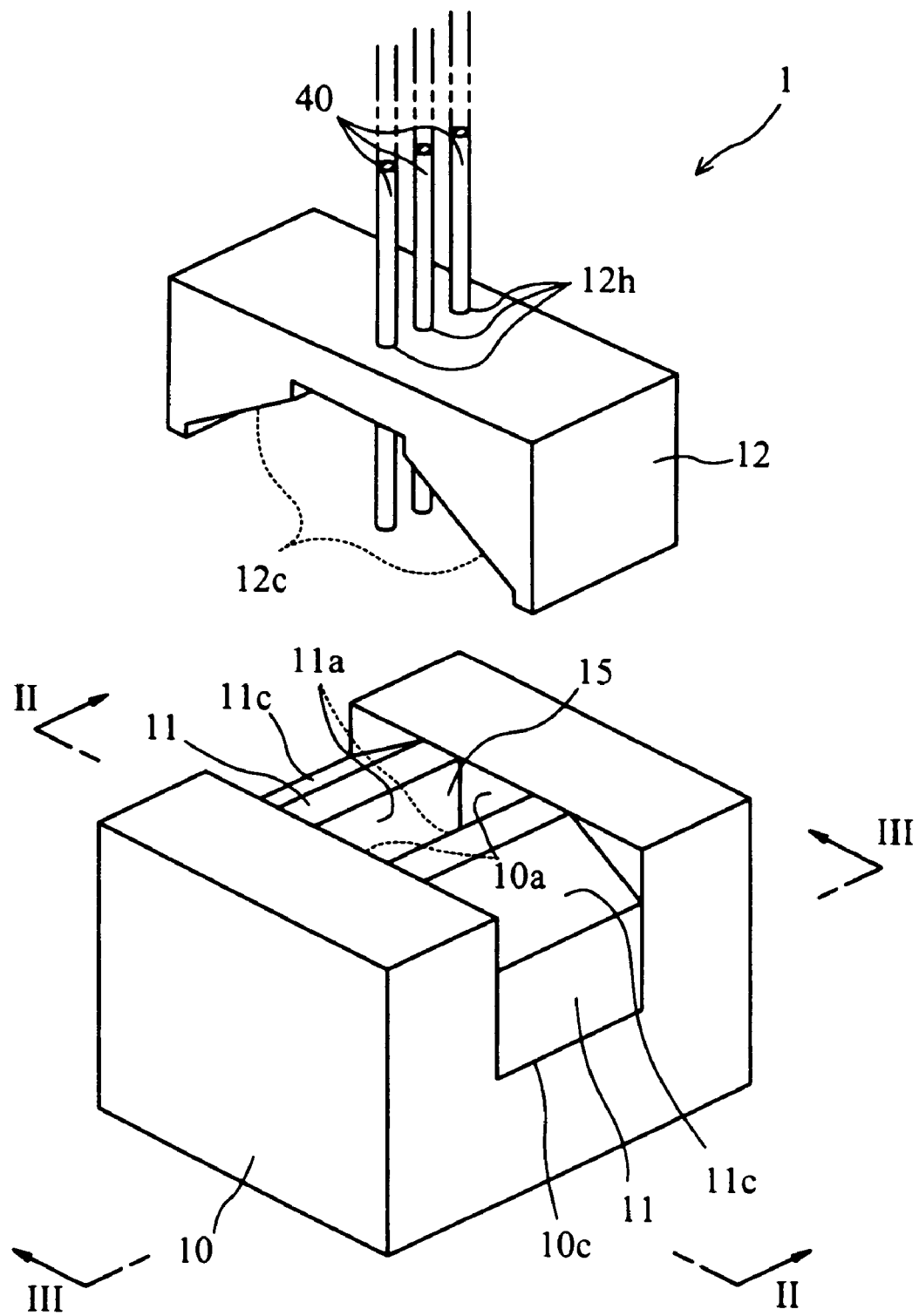
FIG. 1 is a perspective view of a mold used in the manufacturing process based on the present invention.

As shown in FIG. 1, the mold 1 used in the method of the present invention comprises a fixed block 10, a pair of pressure blocks 11, and a vertical movement block 12. Each of the pressure blocks 11 is movably fitted in a groove 10$c$ formed in the fixed block 10. The fixed block 10 has two inward-facing side surfaces 10$a$ and an upward-facing horizontal surface 10$b$ (see FIG. 3). Each pressure block 11 has an inward-facing side surface 11$a$ (see FIG. 2). A space 15 is formed by the side surfaces 10$a$, the horizontal surface 10$b$, and the side surfaces 11$a$.

The vertical movement block 12 is positioned above the space 15 in such a way that it can move freely up and down, powered by an oil-pressure cylinder or similar drive source installed above the same (not shown). The vertical movement block 12 is provided with three vertically extending through-holes 12$h$ for insertion of wires 40. Each wire 40 is made of a metal material such as niobium or tantalum having a valve action (hereinafter simply 'valve metal'). As the explanation below will make clear, the wire(s) 40 is/are used to form the anode(s) of the solid electrolytic capacitor eventually obtained. A wire pay-out apparatus (not shown) is set up above the vertical movement block 12 in order to pay out each wire 40. This wire pay-out apparatus is set up in such a way as to hold the wires 40 in place once it has paid out the same by a desired length through the through-holes 12$h$.

Figure 2:
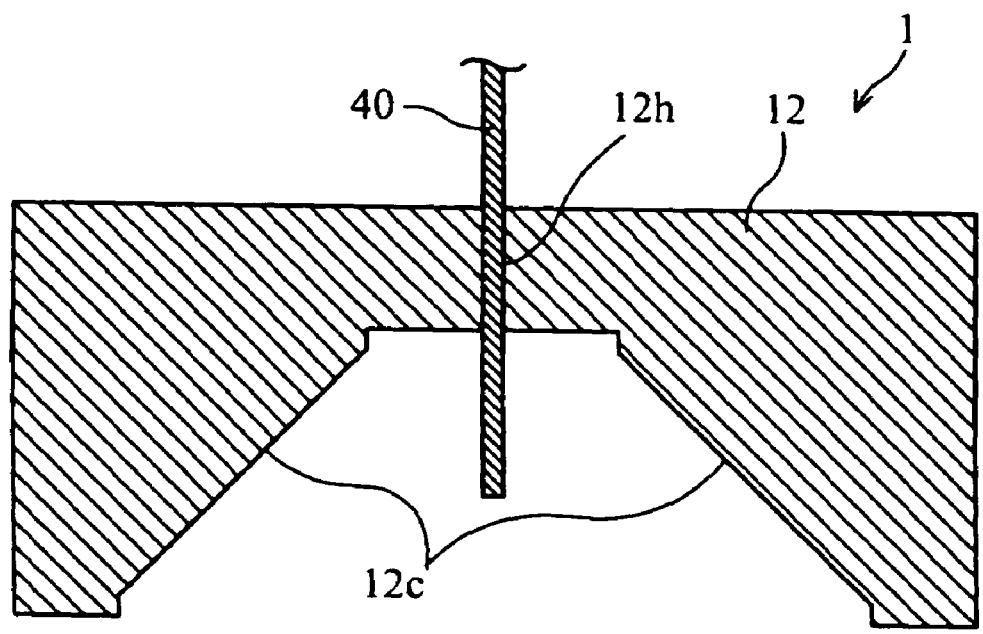
FIG. 2 is a cross section taken along the lines II—II shown in FIG. 1.
Figure 2:
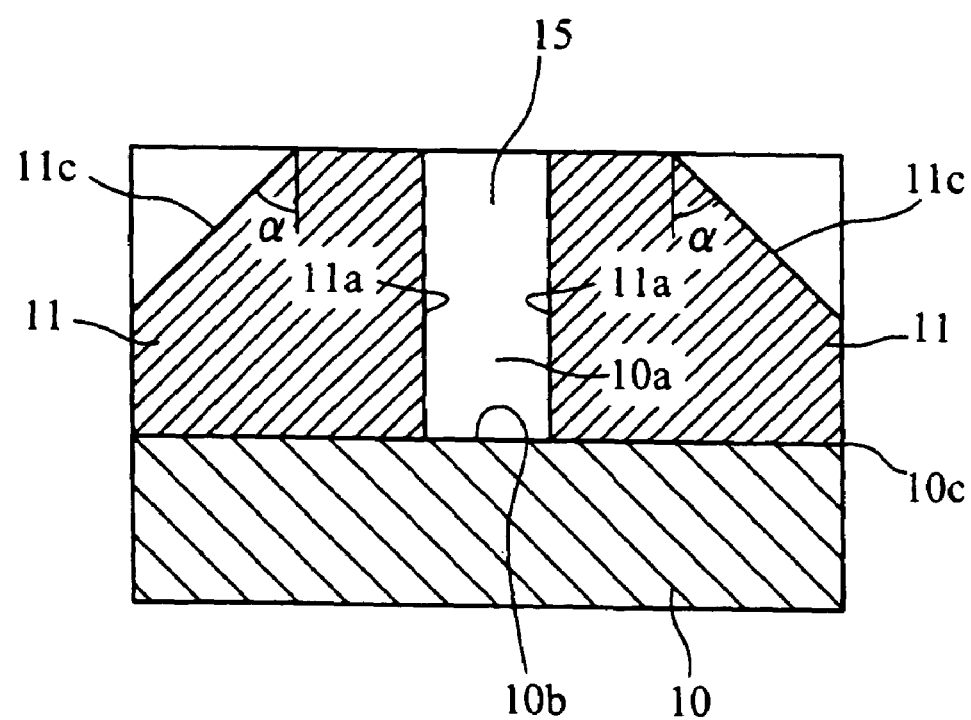
Figure 3:
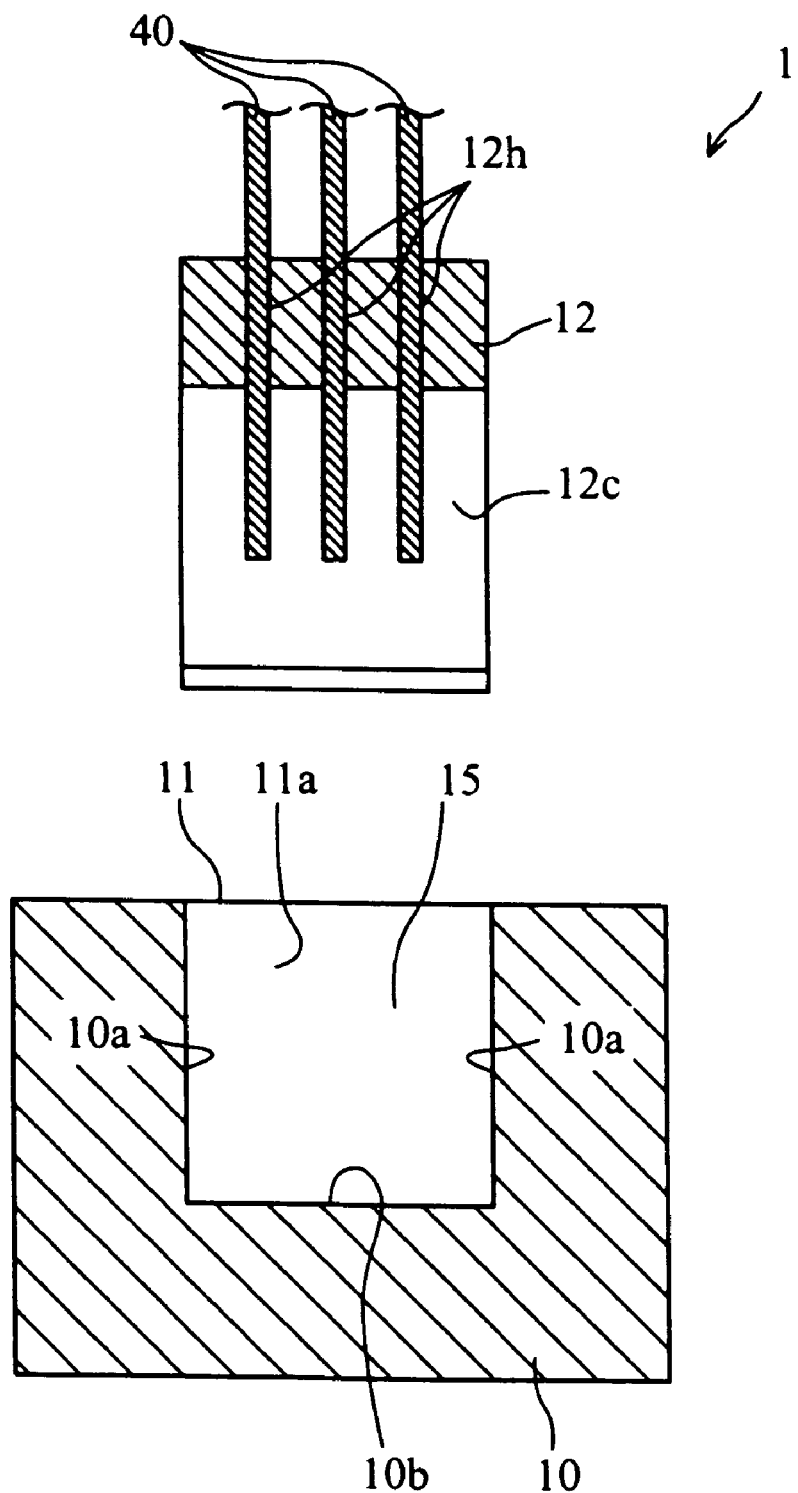
FIG. 3 is a cross section taken along the lines III—III shown in FIG. 1.

As shown in FIG. 2, each pressure block 11 has a sloping face 11$c$ which becomes progressively farther from the space 15 as it extends downward. In the example shown, the angle of the slope $\alpha$ (in relation to the vertical) is 45 degrees, but the present invention is not limited to this, and other angles are also possible. The vertical movement block 12 also has a pair of sloping surfaces 12$c$ which become progressively farther from each other as they extend downward. Each sloping face 12$c$ also has an angle of 45 degrees in relation to the vertical. When the vertical movement block 12 is moved down by means of the non-illustrated drive source, the sloping faces 12$c$ of the vertical movement block 12 are pressed into contact with the sloping faces 10$c$ of the pressure blocks 11. These contact faces slide relatively to one another while maintaining contact therebetween (the sliding direction is inclined at 45 degrees relative to the vertical). As a result, the two pressure blocks 11 move closer to each other horizontally (each block 11 moves toward the center of the space 15). Owing to this arrangement, it is possible to drive both pressure blocks 11 by means of a single drive source. In addition, it is possible for this drive source to be positioned above the vertical movement block 12, thus saving space.

Further, the above arrangement makes it possible to simplify the structure of the mechanism (drive force conversion mechanism) for converting the drive force from the drive source into a compressive force acting in a horizontal direction. Specifically, such drive force conversion can be realized simply by providing the sloping faces 11$c$ and 12$c$ on the pressure blocks 11 and the vertical movement block 12, respectively. Since the structure of the drive force converting mechanism is simple, it easy to increase the rigidity of the pressure blocks 11 or the vertical movement block 12 (by partially increasing the thickness of the blocks, for example). By increasing the rigidity of the blocks, it is possible to apply a greater compressive force to metallic powder 30, thus forming a denser porous body.

According to the present invention, the sloping face 11$c$ of each pressure block 11 may be formed with an elongated protrusion extending along the above-mentioned sliding direction, while the counterpart sloping face 12$c$ of the vertical movement block 12 may be formed with a groove for movably receiving the protrusion (the groove too being elongated along the sliding direction). With this arrangement, the combination of the protrusion and depression functions as a guide means for regulating the sliding direction. As a result, the sloping faces 10$c$ and 12$c$ slide appropriately in the desired direction. Of course, a similar effect can also be achieved by forming a protrusion in the sloping face 12$c$ of the vertical movement block, and a groove in the sloping face 11$c$ of each pressure block 11.

Figure 4:
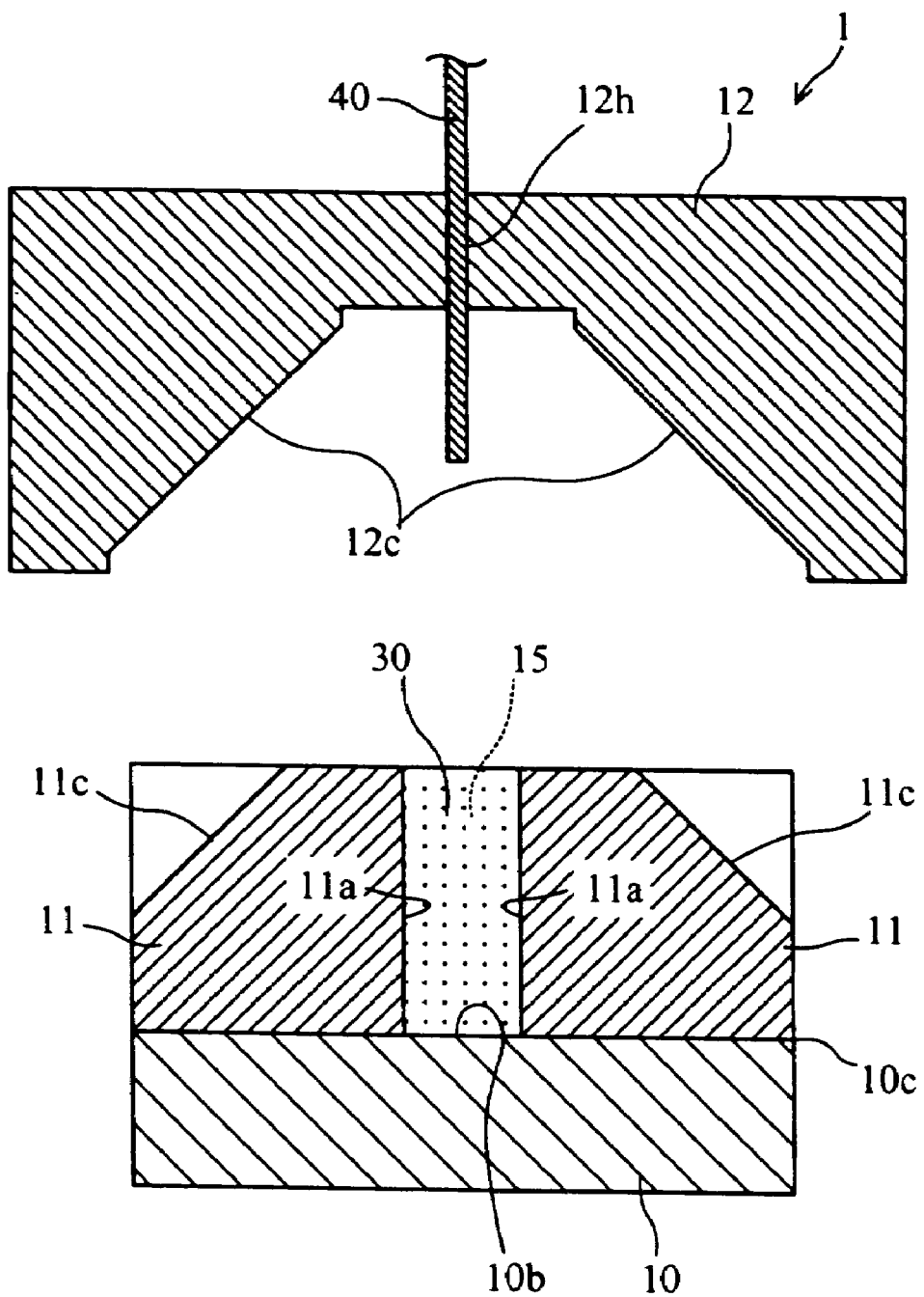
FIG. 4 is a cross section showing a state where a space formed in the above-noted mold has been filled with metal powder.
Figure 11:
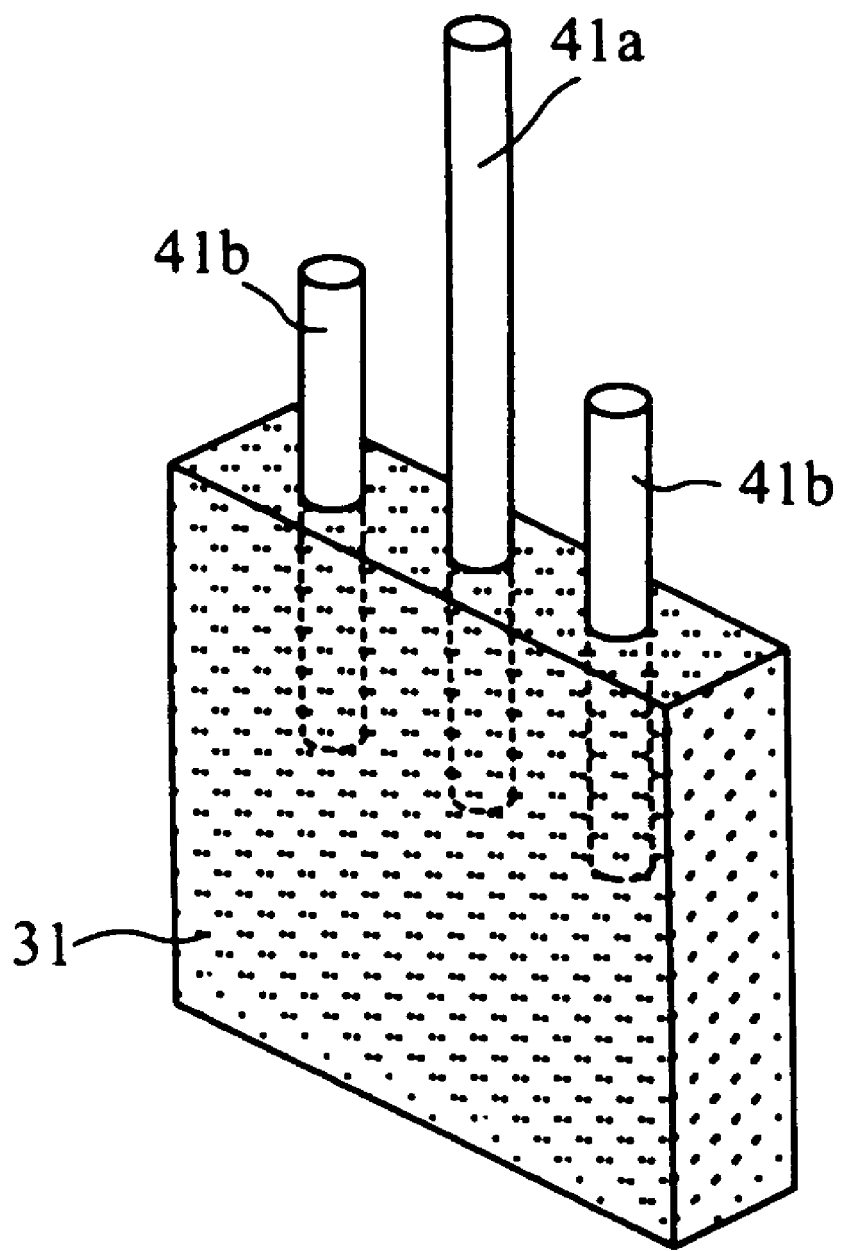
FIG. 11 is a perspective view of an intermediate product obtained by the manufacturing method described above.
Figure 12:
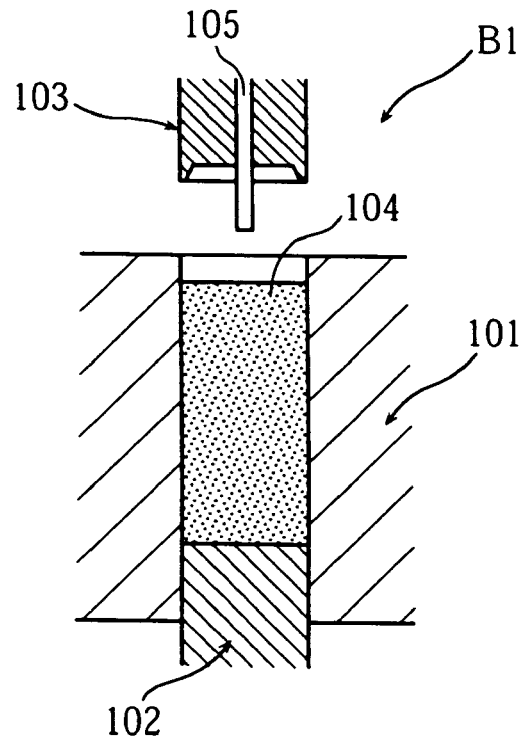
FIG. 12 is a cross section showing a state where metallic powder has been loaded into a space formed by a conventional mold.
Figure 13:
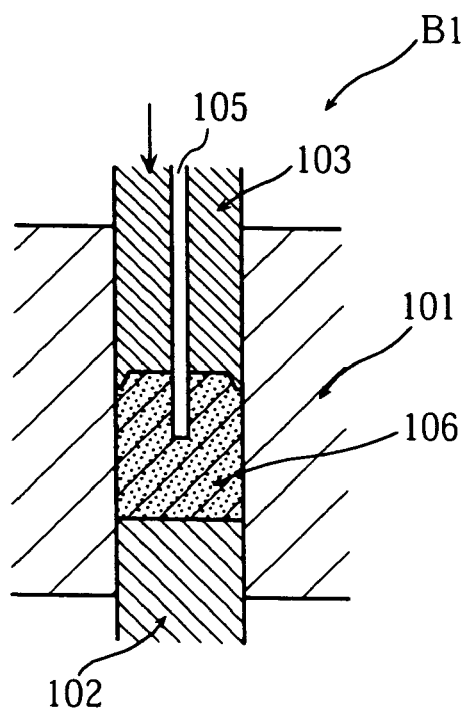
FIG. 13 is a cross section showing the pressurization of the metal powder shown in FIG. 12.
Figure 14:
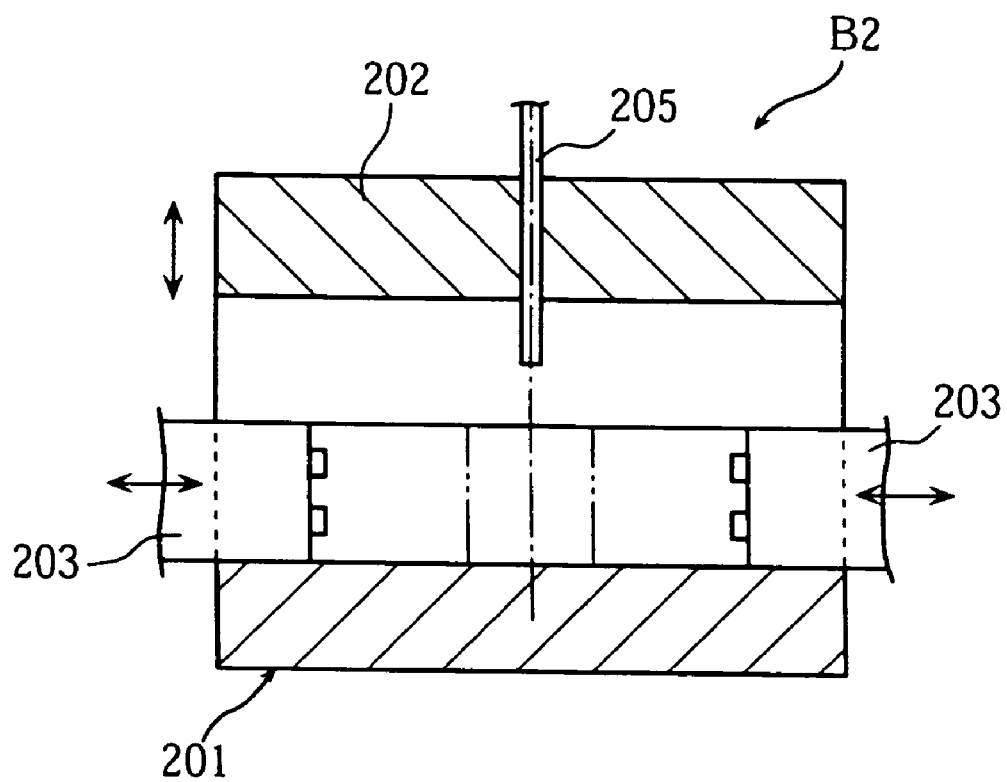
FIG. 14 is a cross section illustrating another example of conventional manufacturing process.

When making the intermediate body shown in FIG. 11, the first step is to set the two pressure blocks 11 on the fixed block 10, as shown in FIG. 4, thus forming a space 15. The space 15 is then filled with valve metal powder 30. Examples of valve metals that may be used for this purpose include metallic materials using niobium or tantalum. When filling the space 15 with the powder it sometimes happens that the top of the powder 30 rises higher than the space 15. Any such surplus should be removed by using a squeegee or similar device. In this way, it is possible to fill the space 15 evenly with a prescribed amount of powder 30.

Figure 5:
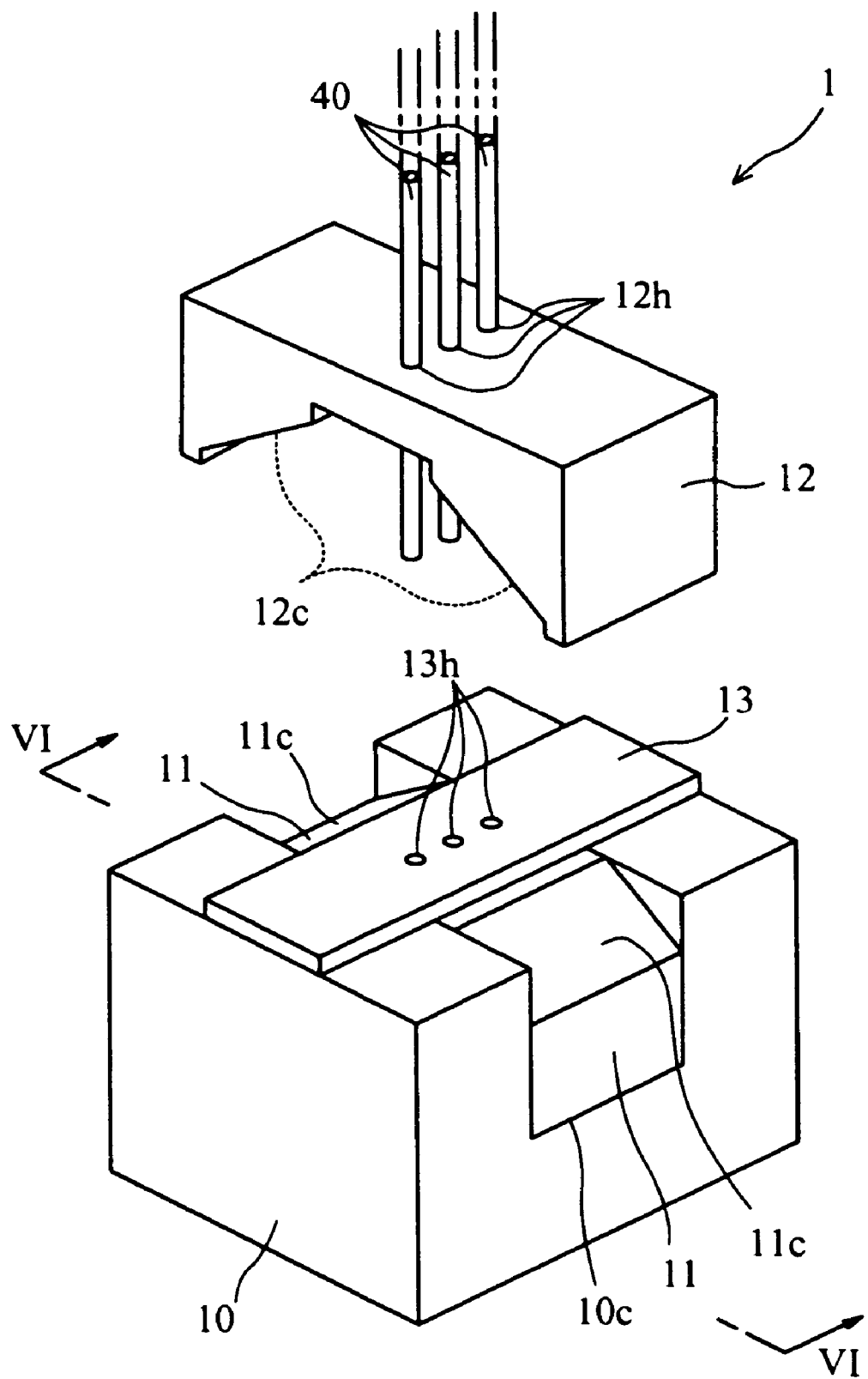
FIG. 5 is a perspective view showing a state where a sealing block has been mounted on top of the above-noted metal powder once this has been loaded into the space.
Figure 6:
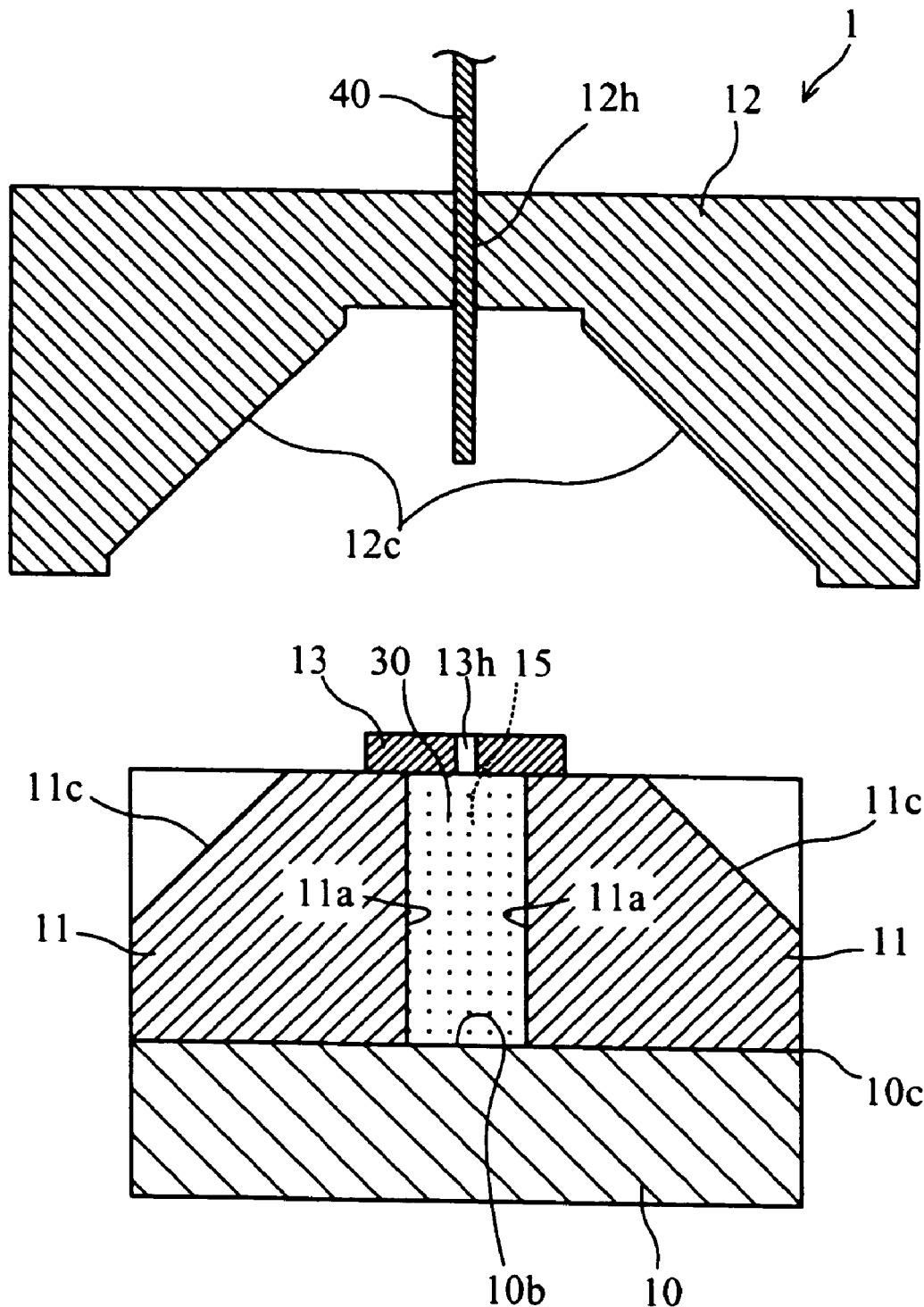
FIG. 6 is a cross section taken along the lines VI—VI shown in FIG. 5.

Next, the space 15 is covered from above with a sealing block 13, as shown in FIGS. 5 and 6. The sealing block 13 is formed with three holes 13h, and is fixed to the fixed block 10 using bolts or the like (not shown).

Figure 7:
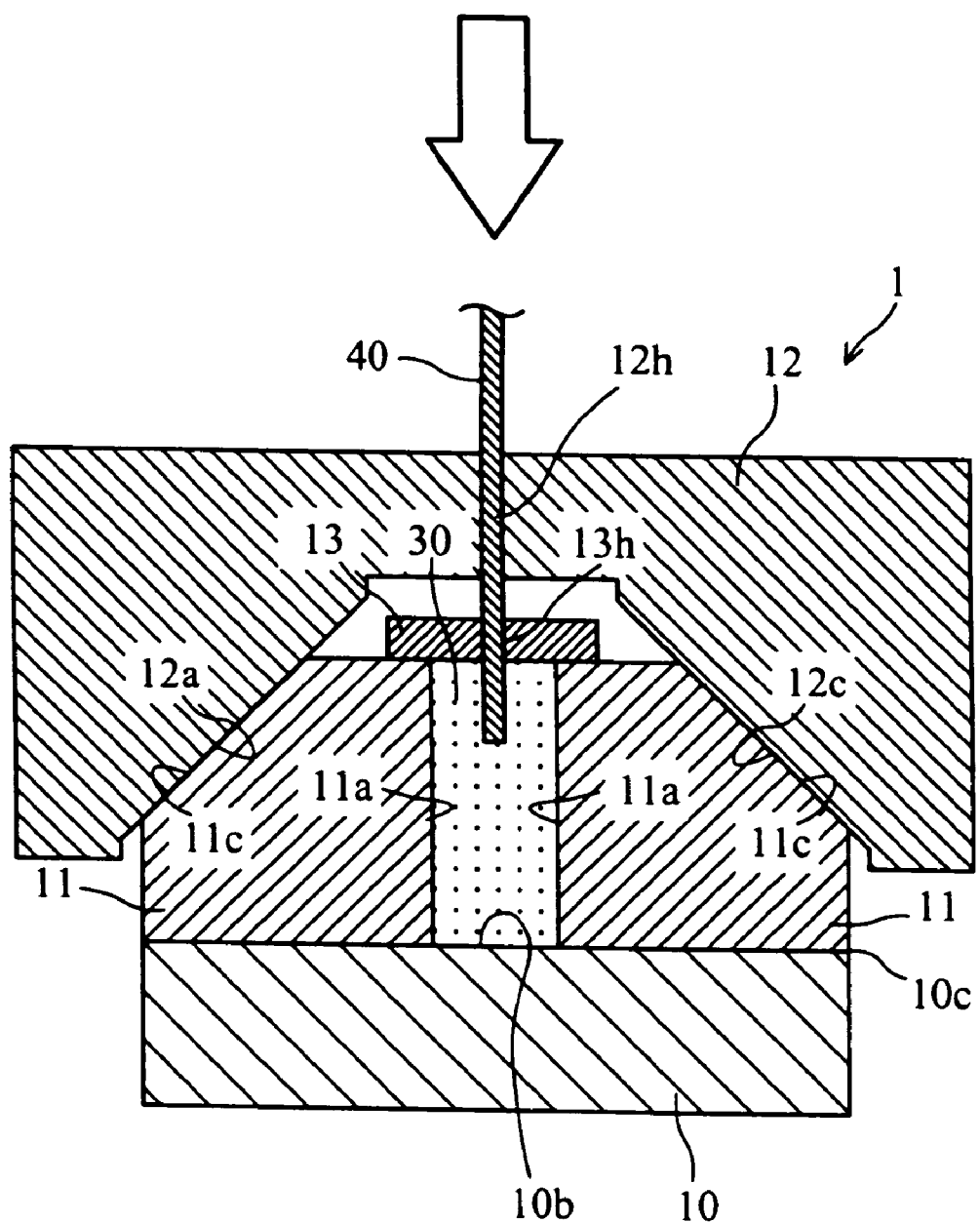
FIG. 7 is a cross section showing a step of embedding a metal wire partially in the above-noted metal powder once this has been loaded into the space.

Next, the vertical movement block 12 is lowered, as shown in FIG. 7. At this point, the three wires 40 are paid out by means of the wire pay-out apparatus asynchronously with the lowering movement of the vertical movement block 12. In this way, each wire 40 descends while protruding a prescribed distance beyond the through-hole 12h. Each of the wires pass through the corresponding through-hole 13h and advances into the powder 30 filling the space 15.

Figure 8:
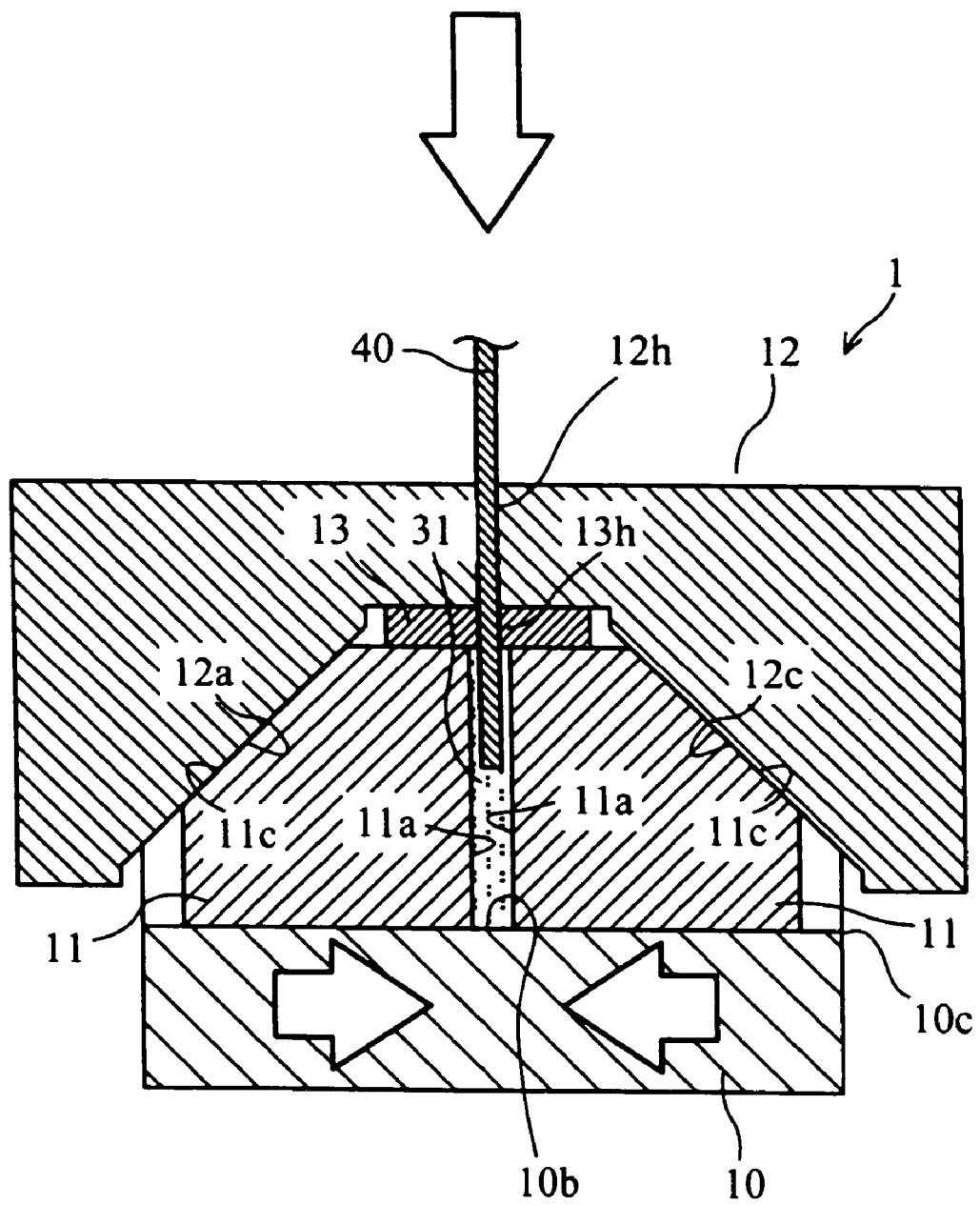
FIG. 8 is a cross section showing a step of pressurizing the above-noted metal powder to form a porous body.

As shown in FIG. 8, the vertical movement block 12 is lowered further, and pressure is applied on the powder 30 by means of the two pressure blocks 11. The vertical movement block 12 is stopped when it reaches a designated position. In the example shown, the vertical movement block 12 is stopped at a point where it has come into contact with the top of the sealing block 13. In this way, a flattened porous body 31 is formed from the metallic powder 30.

In the process described above, the compression of the powder 30 takes place thicknesswise of the porous body 30 (i.e. horizontally). The porous body 31 is flattened, and has a relatively small thickness (e.g. 1 mm or less). As a result, the compression distance for the powder 30 is also short. In the present embodiment, in relation to the thickness Tp of the porous body 31, the compression distance can be set at either 1×Tp or 2×Tp. In the latter case, if the thickness Tp is 1 mm, the compression distance is 2 mm. This in turn means that the two pressure blocks 11 that form the space 15 is only 3 mm (1 mm+2 mm) apart horizontally when the space 15 is filled with the powder 30. With such a short compression distance, the density of the porous body 31 formed from the powder 30 will be substantially uniform. This reduces the risk of the porous body 31 suffering warping or other damage during the firing process.

Furthermore, in the compression process described above, the side surface 11a of each of the pressure blocks 11 exert pressure on the powder 30 only horizontally. Because of this, no vertical relative movement takes place between the side surface 11a and the powder 30. In other words, the side surface 11a and the powder 30 do not rub abrasively against each other. This helps to prevent any wearing down of the microscopic holes on the surface of the two main surfaces of the porous body 31 (the faces that come into contact with the side surfaces 11a of the pressure blocks). Consequently, in the subsequent process, the porous body 31 can be impregnated appropriately with an aqueous solution for forming a dielectric layer and an electrolyte layer via these two main surfaces.

Figure 9:
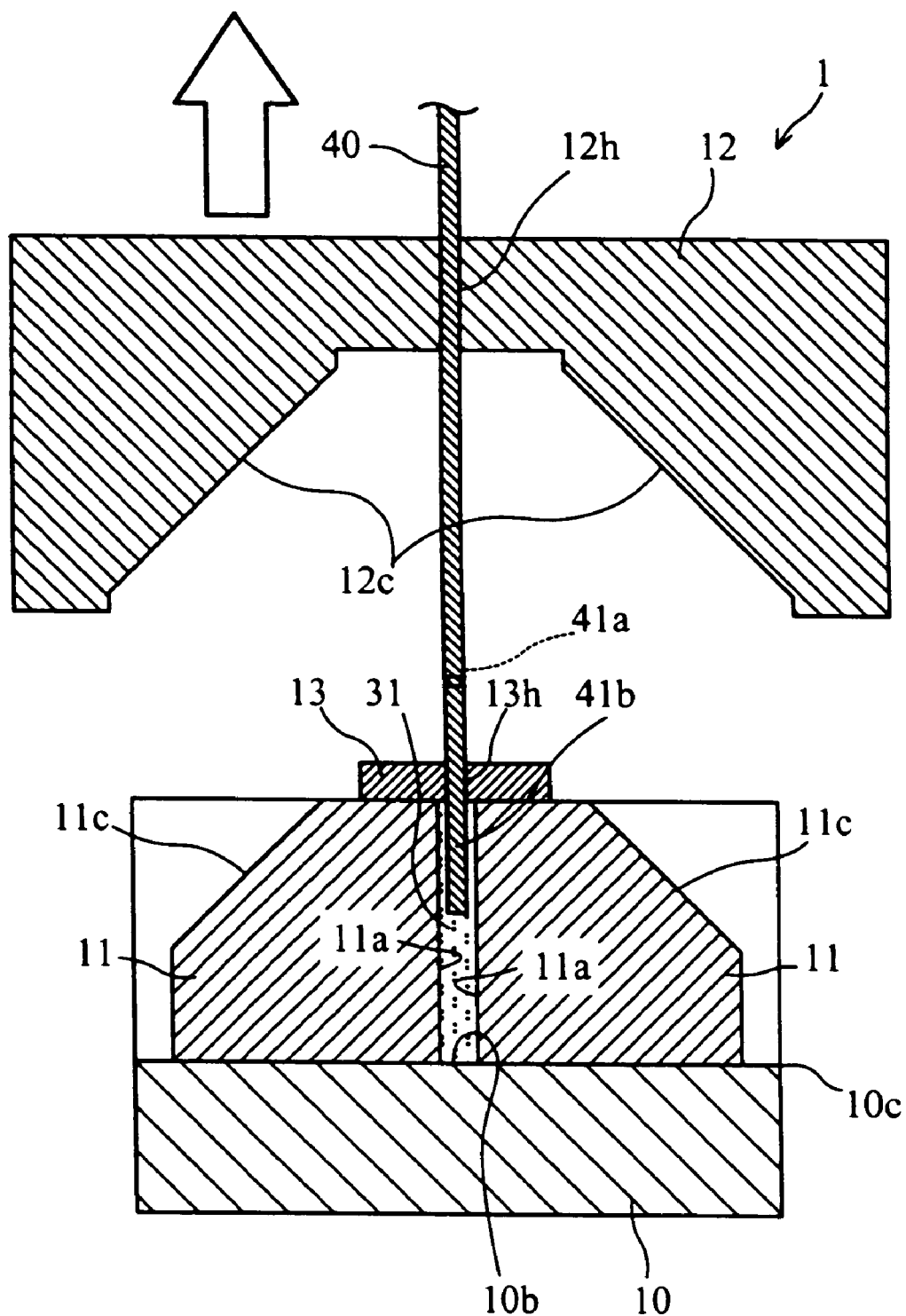
FIG. 9 is a cross section showing a step of withdrawing the vertical movement block from the mold mentioned above.

Once the porous body 31 is formed, the vertical movement block 12 is lifted away, as shown in FIG. 9. This is done while the wires 40 are still held in place by the wire pay-out apparatus mentioned above (not shown). This prevents any weakening of the connection between the wires 40 and the porous body 31, and ensures that the wires 40 are not pulled out of porous body 31 while vertical movement block 12 retreats.

Figure 10:
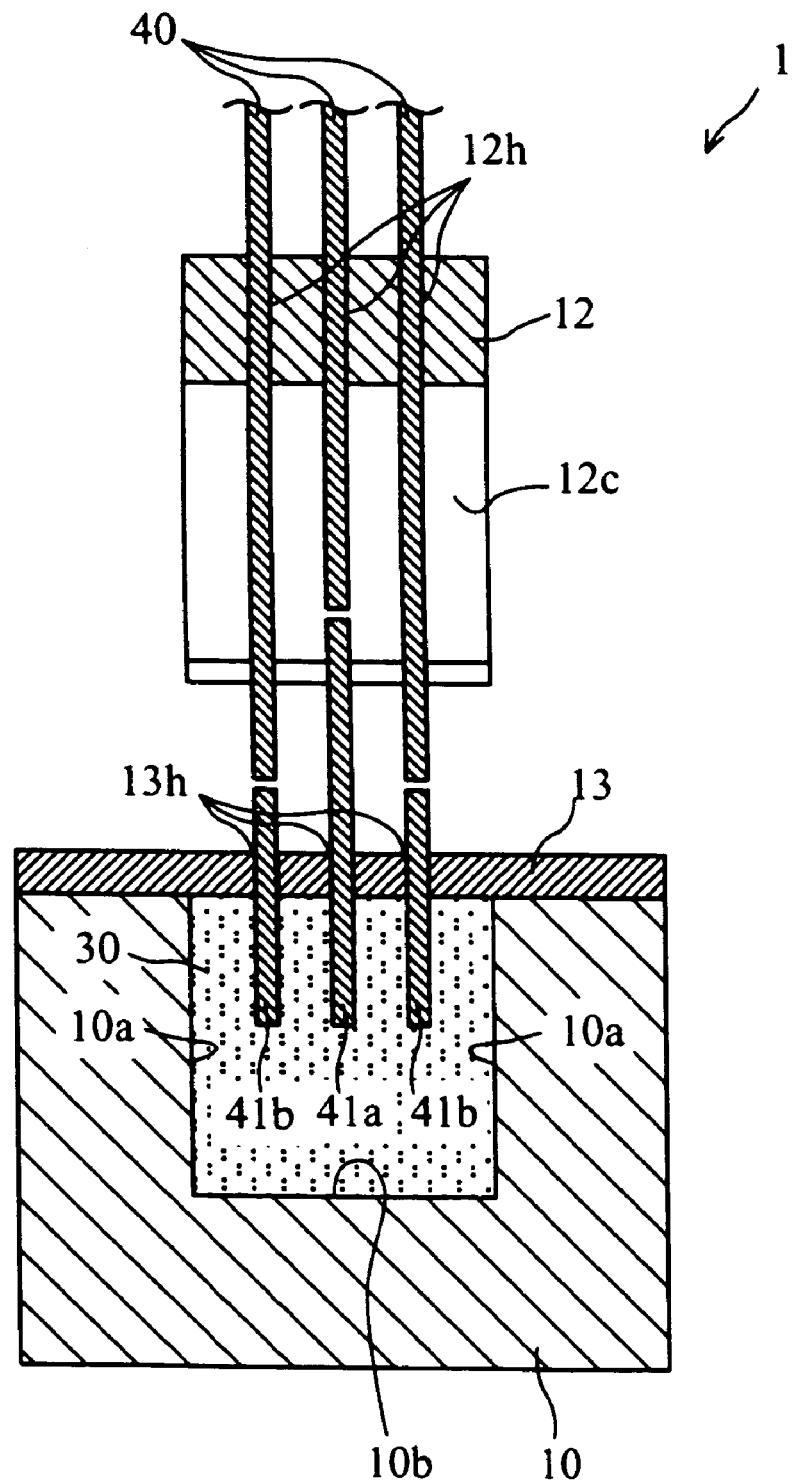
FIG. 10 is a cross section showing a step of severing the wire partially embedded in the porous body mentioned above.

Next, as shown in FIG. 10, each wire 40 is severed at a prescribed point. In the example shown, the middle one of the three wires 40 has been severed at a point further spaced away from the porous body 31 than the other two. As a result, the anode 41a at the center is longer than the other two anodes 41b.

After this, the vertical movement block 12 is raised still further. Next, the sealing block 13 is removed, the two pressure blocks 11 are detached and moved away from one another, and the porous body 31 is removed from the apparatus. In this way the intermediate body shown in FIG. 11 is obtained. After this, the porous body 31 is subjected to a firing process to produce a sintered body which in turn is subjected to chemical processes required to form a dielectric layer and an electrolyte layer, thereby providing a desired solid electrolytic capacitor.

When removing the intermediate body from the manufacturing apparatus and forming the dielectric layer and the electrolyte layer, it is desirable to support the intermediate body by the anode 41a so as to avoid directly holding the porous body 31. Doing this will avoid collapsing the numerous microscopic holes on the surface of the porous body 31 or causing any other damage to the porous body 31 itself. By making the other anodes 41b relatively short in length, the amount of wire 40 used is kept to a minimum, thus helping to keep costs low.

In the intermediate product shown in FIG. 11, the anodes 41a and 41b are partially embedded in the porous body 31, but the present invention is not limited to such a structure. It would also be possible to weld or glue a wire or wires of a prescribed length to the surface of the porous body (or its sintered body) once it had been formed, for example.

A solid electrolytic capacitor made using the intermediate product shown in FIG. 11 can be designed so that the circuit current flows out from the anode 41a and into the two other anodes 41b. This makes it possible to eradicate noise occurring in broad frequency bands. Furthermore, dispersing the circuit current so that it flow into two anodes makes it possible to achieve lower resistance and lower impedance. Consequently, it is possible to prevent ignition at the capacitor, and to provide a high-capacitance power supply at high levels of responsiveness.

A solid electrolytic converter made according to the method of the present invention may be used not only for noise reduction in devices such as CPUs, but also for improving the output smoothness of DC—DC converters and the reduction of ripple currents from bypass circuits.

In the embodiments described above, a wire pay-out device is used for causing the wires 40 to protrude into the space 15, but the present invention is not limited to this structure. For example, it would also be possible to prepare wires cut into a prescribed length, and then to fix the top ends of these wires to support holes formed in the vertical movement block 12. In this case, those parts of the wires that protruded down from the support holes would enter the space 15 with the lowering of the vertical movement block 12.

The preceding explanations notwithstanding, it is evident that the present invention can be modified into numerous other modes. Any and all such modifications not departing from the ideas and field of the present invention and that would be clear to a person skilled in the art should be taken as included within claims laid out below.

What is claimed is:

1. A method of manufacturing a solid electrolytic capacitor, with use of a mold which comprises a pair of horizontally movable pressure blocks facing each other to define a molding space, each of the pressure blocks having a sloping face; a fixed block supporting the pair of pressure blocks; and a vertical movement block positioned above the pair of pressure blocks, the vertical movement block having sloping faces for engagement with the sloping faces of the pressure blocks; to method comprising the steps of:

filling the molding space with valve metal powder; and compressing the powder by bringing the pair of pressure blocks toward each other for forming a flattened porous body;

wherein the compression of the powder is performed by lowering the vertical movement block for bring the sloping faces of the vertical movement block toward and into engagement with the sloping faces of the pressure blocks.

2. The method for making a solid electrolytic capacitor according to claim 1, further comprising the steps of:

introducing into the molding space from above at least one wire made of a valve metal before the compression of the powder; and severing the wire at a position spaced from the porous body after the compression of the powder.

3. The method for making a solid electrolytic capacitor according to claim 2, wherein at least two wires are introduced into the molding space in the wire-introducing step, and the wires are severed at differing dimensions of protrusion from the porous body in the wire-severing step.

* * * * *